May 7, 1968     C. L. SCHREIBER ET AL     3,382,137
LAMINATED STRUCTURES AND METHOD FOR PREPARING SUCH STRUCTURES
Filed Sept. 18, 1964

INVENTORS
CHARLES L. SCHREIBER
KENNETH E. KOLB

ATTORNEYS

United States Patent Office
3,382,137
Patented May 7, 1968

3,382,137
LAMINATED STRUCTURES AND METHOD FOR
PREPARING SUCH STRUCTURES
Charles L. Schreiber and Kenneth E. Kolb, Corning, N.Y.,
assignors to Corning Glass Works, Corning, N.Y., a corporation of New York
Filed Sept. 18, 1964, Ser. No. 397,374
10 Claims. (Cl. 161—185)

ABSTRACT OF THE DISCLOSURE

A laminated glass structure of high strength comprising a plurality of thin glass sheets having a thickness from 0.0001 inch to 0.030 inch bonded together with a cured synthetic resin layer, said resin being one which shrinks upon curing, adheres to glass and upon curing exists in a rigid state. The high strength of the laminate is produced by the compressive forces exerted on the glass layer by the shrunken, cured, synthetic layer, the laminates are prepared by incorporating a synthetic resin between a plurality of thin sheets of glass and heating to cure and shrink the resin, thereby creating a compressive force on the thin sheets of glass.

---

The present invention relates to a novel laminated structure and to a method for preparing such structures. More particularly, this invention relates to thin glass laminates and to the method for preparing such glass laminates.

A great deal of research has been conducted with a view towards combining the desirable properties of glass and plastic in a single composite article. Glass exhibits high resistance to scratching, discoloration by heat and light, and weathering, and also has an insignificant permeability to gases. Most plastics are light in weight and highly resistant to breakage. Although many attempts have been made to laminate glass to plastic and thereby produce an article combining the desirable properties of each, with the exception of plastics impregnated with glass fibers or glass cloth, these attempts have met with little success.

Accordingly, it is an object of this invention to provide a laminate having the desirable properties of glass and plastic.

More particularly, it is an object of the present invention to provide a laminate comprising a plurality of thin glass sheets joined together by a synthetic resin core bonding layer.

It is a further object of this invention to provide a method for producing superior glass-plastic laminated structures.

In general, these and other objects of this invention are accomplished by laminating a plurality of thin glass sheets with a synthetic resin adhesive core which shrinks upon curing. The shrinkage of the plastic produces compressive stress in the glass layers and thereby strengthens the glass. The laminated articles have much greater strength than do comparable materials.

The invention will be more fully understood in view of the following detailed description considered in the light of the accompanying drawing.

Figure 1:
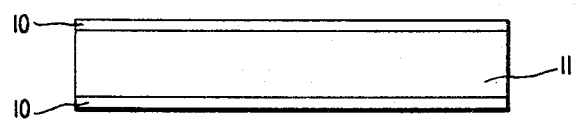
FIGURE 1 is a side view of the laminate of this invention.

FIGURE 1 illustrates a typical laminate of this invention. A layer of synthetic resin 11 is sandwiched between two thin glass sheets 10. The resin 11, which shrinks upon curing, produces compressive forces in the adhered, thin glass sheets 10.

Any glass which can be formed into thin sheets may be used in the laminates of this invention. The glass can be treated to increase its strength prior to being incorporated into the laminates, although in a preferred embodiment, the glass is not pretreated. The shrinkage of the synthetic resin core places the surface of the glass under compression which increases the glass strength as well as the strength of the laminate. This strengthening, caused by the shrinkage of the core, permits the use of glass which has not been pre-strengthened. However, the glass may be treated by well known methods, such as chill tempering, to increase its strength prior to lamination. In one embodiment, the glass is one which has been strengthened by a low temperature ion-exchange technique. Glasses of this type have their surface ions replaced by larger ions which exert a physical compression on the surface of the glass, similar to the effect produced by chill tempering. Low temperature ion-strengthening glasses are more particularly described in co-pending applications, Ser. Nos. 181,886 and 181,887, both filed Mar. 23, 1962. The glass which is used is in the form of extremely thin sheets. Glass sheets of a thickness in the range of from 0.0001 inch to 0.030 inch are satisfactory with a range of from 0.002 inch to 0.010 inch being preferred.

A wide variety of synthetic resins may be used as the core of the subject laminates. The criteria which must be followed in choosing the resin is that the resin must shrink upon curing, must adhere to the glass while curing and upon curing, must exist in a rigid state. All three of these propertties must be found in the resin bonding layer for a suitable laminate to be formed. Resins which have proven satisfactory include epoxy resins, such as bisphenol A-epichlorohydrin condensation products, unsaturated polyester resins, acrylic resins, such as methyl methacrylate, and a wide variety of vinyl resins, such as styrene polymers. If the resin does not strongly adhere to the glass, a coupling agent must be employed. This agent may be added to the uncured resin, applied to the glass surface, or both. A wide variety of coupling agents, well known to those skilled in the art, may be used with the particular coupling agent being dependent upon the synthetic resin core employed. A suitable coupling agent is 3-(trimethoxysilyl) propyl methacrylate which has been used to produce laminates with unsaturated polyesters, acrylics, and polystyrenes which do not normally adhere to glass.

The most important property of the synthetic resin core chosen is that it shrinks upon curing. This shrinkage, in a layer of material which is tightly bound to the glass, produces compressive stresses in the glass. These stresses strengthen the glass layers and thereby produce an impact resistant article. Normally, the laminates of this invention will have glass layers under a compressive stress of from between approximately 10,000 p.s.i. and 100,000 p.s.i.

A factor influencing the compression within the glass is the relative thickness of the glass plate and the adhesive core. The thinner the glass or thicker the resin, the greater the compression setup. Table I sets forth the compression within glasses of varying thicknesses. The laminates were prepared by bonding together two low temperature ion-strengthening glass plates with a 0.25 inch thick layer of epoxy resin. The epoxy resin used is EPON 828, a bisphenol A-epichlorohydrin condensation product having an epoxide equivalent weight of 187. As can be seen from Table I, as the thickness of the glass plate increases, the compressive stress produced decreases. Decreasing the compressive stress reduces the strength of the glass and produces a weaker article.

TABLE I.—GLASS COMPRESSION VERSUS
GLASS-RESIN RATIO

| Glass thickness in inches: | Compression in glass, p.s.i. |
|---|---|
| 0.003 | 61,000 |
| 0.005 | 51,000 |
| 0.010 | 31,000 |

Figure 2:
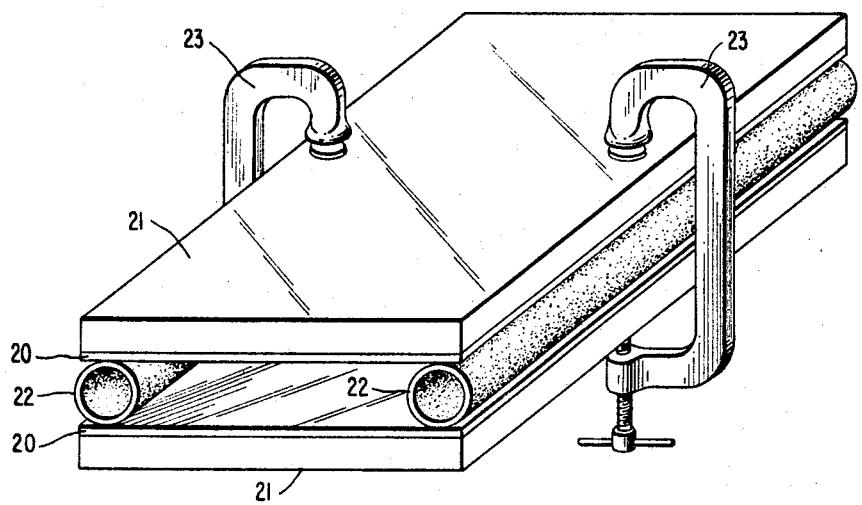
FIGURE 2 is a slightly perspective view of an arrangement of apparatus useful in producing the laminates of this invention.

The laminates of this invention may be prepared by casting a layer of a suitable synthetic resin between two supported thin glass sheets. A suitable arrangement of apparatus for producing these laminates is illustrated in FIGURE 2. Two thin sheets of glass 20 are separated by a 0.25 inch diameter rubber gasket 22, to form a casting cell. The glass sheets 20 are supported with 0.13 inch thick heat resistant glass sheets 21. The assemblage is maintained by use of clamps 23. The synthetic resin core is introduced into the space between sheets 20 while in a liquid state or in solution and then cured by heating. The heating causes the resin to cure, which causes it to shrink, and adhere to the glass, thereby producing a laminated article having its glass surfaces under compression. The shrinking is not merely the result of thermal compression, but rather is caused by molecular reaction. The curing times and temperatures may be varied over wide ranges without affecting the results.

The invention will be better understood by reference to the following detailed examples.

Example I

A casting cell is constructed by placing a 0.25 inch thick rubber gasket between two sheets of 0.005 inch thick low temperature ion-strengthened glass. The glass is backed with sheets of 0.13 inch thick heat resistant glass and the assemblage maintained by use of clamps. Into this cell, there is introduced a solution containing 100 parts by weight of a bisphenol A-epichlorohydrin condensation product (Shell EPON 828) and 80 parts by weight of hexahydrophthalic anhydride. The composite is then heated at 120° C. for approximately 4 hours. The heating causes the resin to cure, shrink and adhere to the glass. This produces a 0.25 inch thick plate of epoxy resin covered on both flat surfaces with a 0.005 inch thick glass layer. By optical examination with a polarimeter, the glass is shown to be under a compressive force of about 51,300 p.s.i. The final product has the scratch resistance of glass and the weight of plastic. Compared to conventional plastic, this article has improved resistance to heat and light discoloration, greater resistance to weathering and essentially zero permeability to gases. Compared to conventional glasses, this article is much more resistant to breakage.

In the manner set forth in Example I, a series of laminates are prepared using epoxy resins of increasing molecular size. As shown in Table II, as the equivalent weight of the epoxy starting material is increased, the amount of compression set up in the glass is decreased. This is probably because less shrinkage occurs upon curing the higher molecular weight materials. Thus, articles of maximum strength are prepared using the lower molecular weight epoxy resins. Although this relationship between molecular weight and compression is established for epoxy resins, it has not been established for other synthetic resin cores. Of course, there is no reason to believe there would be a correlation between the molecular weights of non-analogous materials and the compression they will produce when used in the laminates of this invention.

TABLE II.—GLASS COMPRESSION VERSUS
EPOXY WEIGHT

| Epoxy | Av. Epoxide Equivalent Wt. | Compression in Glass, p.s.i. |
|---|---|---|
| Epon 828 | 187 | 51,300 |
| Epon 834 | 227 | 46,000 |
| Epon 1001 | 485 | 41,000 |
| Epon 1002 | 715 | 36,000 |

As previously noted, the synthetic resin core used does not have to be one which itself adheres to the glass plates. When the resin does not adhere to the glass, a coupling agent must be added thereto.

Example II

In a cell similar to that used in Example I, there is placed a composition containing 100 parts by weight of polymethyl methacrylate of molecular weight 100.11 and 1 part by weight of benzoyl peroxide catalyst. The composite is heated at 50° C. until the resin gels, which was about 16 hours. Then it is post cured for 1 hour at 100° C. By this procedure, a sheet of polymethyl methacrylate resin is prepared. However, as the polymethyl methacrylate does not adhere to the glass sheet, no laminated product was produced.

Example III

The procedure of Example II is followed except that 2 parts by weight of 3-(trimethoxysilyl) propyl methacrylate are added to the polymethyl methacrylate solution. Upon curing in the manner set forth in Example II, a laminated product having the polymethyl methacrylate tenaciously adhered to the glass is produced. By use of a polarimeter, the compression in the glass was measured to be 17,300 p.s.i.

The laminates of this invention are highly resistant to breakage. The impact strength of these laminates is tested by supporting a laminate comprised of two 0.007 inch thick glass sheets, which have not been prestrengthened, having a core of epoxy resin 0.236 inch thick on three steel balls having diameters of 0.5 inch. The balls are located on 3-inch centers. The sample is abraded on the bottom side and a 4-ounce steel ball is dropped, from successively greater heights, until the piece is bruised or broken. This particular laminate failed at ball drops from a height of 20 to 24 inches. Table III sets forth the impact strength of other materials well known in the art.

TABLE III

| Item | Thickness | Failure point, in. | Remarks |
|---|---|---|---|
| Vitrolux | .235 | 14 | Tempered Spandrel Glass. |
| ¼″ Laminated Safety Plate. | .252 | 3 | Bottom Layer Checked. |
| ¼″ Plate Glass | .240 | 3 | Bottom Layer Checked. |
| ¼″ Epoxy Laminate. | .250 | 38 | .007 Glass Veneer. |

The laminated articles of this invention are unique and highly useful. They have the scratch resistance of glass rather than plastic and are more resistant to discoloration by heat than is plastic. For example, a sheet of epoxy resin subject to 175° C. became dark and transmitted only 10% of light after 3 weeks. When this same epoxy resin was surfaced with thin glass sheets to produce the laminate of this invention, it transmitted 50% of visible light after 5 months at 175° C. These laminates also are characterized by a water-permeability essentially zero.

These laminates are useful for a variety of glazing purposes. They may be used as partitions, safety windows, auto windows, marine windows, aircraft windows, and in lighting panels. Their high impact resistancy renders them useful as glass veneers for materials, such as wood, ceramic, plastic, large mirrors, furniture tops, bench tops, solar radiation shields, and for numerous other purposes which will readily occur to those skilled in the art.

It will be obvious to those skilled in the art that various changes and modifications may be made in the present products and methods as illustrated and described herein without departing from the spirit or scope of the invention as expressed in the following claims.

What is claimed is:

1. A laminated structure comprising a plurality of thin glass sheets bonded by a layer of a cured synthetic resin, said thin glass sheets having a thickness of from 0.0001 to 0.030 inch and being under compression produced by the shrinkage of said layer of synthetic resin upon curing.

2. The structure of claim 1 wherein said synthetic resin is an epoxy resin.

3. The structure of claim 1 wherein the glass is under a compression of from 10,000 to 100,000 p.s.i.

4. A laminated structure comprising two thin sheets of glass having a thickness of from 0.0001 to 0.030 inch and a cured synthetic resin bonding layer between said two thin sheets of glass, said glass being under compression of from 10,000 to 100,000 p.s.i. produced by the shrinkage of said resin bonding layer upon curing.

5. The structure of claim 4 wherein said bonding layer is an epoxy resin.

6. The structure of claim 4 wherein said bonding layer is polymethyl methacrylate containing an effective amount of 3-(trimethoxysilyl) propyl methacrylate, as a coupling agent.

7. The structure of claim 4 wherein said glass sheets have a thickness of from 0.002 to 0.010 inch.

8. A method for producing a glass to resin laminate comprising introducing a solution of a synthetic resin between two thin sheets of glass, said sheets having a thickness of from 0.0001 to 0.030 inch, said resin being one which shrinks upon curing, adheres to glass and upon curing exists in a rigid state and heating to cure and shrink said resin and thereby create a compressive force on said thin sheets of glass.

9. The method of claim 8 wherein said resin is an epoxy resin.

10. The method of claim 8 wherein said resin is polymethyl methacrylate and said solution further contains 3-(trimethoxysilyl) propyl methacrylate as a coupling agent.

References Cited

UNITED STATES PATENTS

| | | | |
|---|---|---|---|
| 2,231,471 | 2/1941 | Hill | 161—194 X |
| 3,111,570 | 11/1963 | Strang et al. | 161—185 X |
| 3,285,802 | 11/1966 | Smith et al. | 161—185 |
| 3,297,186 | 1/1967 | Wells | 161—185 X |
| 3,321,099 | 5/1967 | Carlyle et al. | 161—185 X |
| 3,334,008 | 8/1967 | Park et al. | 156—99 |

EARL M. BERGERT, *Primary Examiner.*

HAROLD ANSHER, *Assistant Examiner.*